(12) United States Patent
Schlitz et al.

(10) Patent No.: US 8,596,429 B2
(45) Date of Patent: Dec. 3, 2013

(54) BRAKE DISK COMPRISING A CERAMIC FRICTION RING

(75) Inventors: Helmut Schlitz, Hildrizhausen (DE); Hans-Georg Riedel, Pforzheim (DE); Bjoern Spangemacher, Sindelfingen (DE); Gerhard Mauch, Stuttgart (DE)

(73) Assignee: Freni Brembo S.p.A., Curno, Bergamo (IT)

(*) Notice: Subject to any disclaimer, the term of this patent is extended or adjusted under 35 U.S.C. 154(b) by 760 days.

(21) Appl. No.: 10/556,261

(22) PCT Filed: May 3, 2004

(86) PCT No.: PCT/EP2004/004653
§ 371 (c)(1),
(2), (4) Date: Sep. 28, 2007

(87) PCT Pub. No.: WO2004/102026
PCT Pub. Date: Nov. 25, 2004

(65) Prior Publication Data
US 2008/0035437 A1 Feb. 14, 2008

(30) Foreign Application Priority Data
May 14, 2003 (DE) .................................. 103 21 797

(51) Int. Cl.
*F16D 65/12* (2006.01)

(52) U.S. Cl.
USPC .................................................. 188/218 XL

(58) Field of Classification Search
USPC ......................................... 188/218 XL, 18 A
See application file for complete search history.

(56) References Cited

U.S. PATENT DOCUMENTS

| | | | | |
|---|---|---|---|---|
| 2,368,621 A | * | 2/1945 | Tack | 188/264 A |
| 2,987,143 A | * | 6/1961 | Fuchs et al. | 188/71.5 |
| 3,899,054 A | * | 8/1975 | Huntress et al. | |
| 5,864,935 A | * | 2/1999 | Baumgartner et al. | 29/416 |
| 6,302,246 B1 | * | 10/2001 | Naumann et al. | |
| 6,386,341 B1 | * | 5/2002 | Martin | |
| 6,786,310 B2 | * | 9/2004 | Lin | |

FOREIGN PATENT DOCUMENTS

| | | |
|---|---|---|
| DE | 2002 437 A | 7/1971 |
| DE | 2 201 885 A | 8/1973 |
| DE | 34 32 501 A1 | 3/1986 |
| DE | 297 10 533 U1 | 1/1998 |
| EP | 1 260 728 A1 | 11/2002 |
| FR | 1 486 577 A | 6/1967 |
| JP | 2002-048167 A | 2/2002 |

* cited by examiner

*Primary Examiner* — Anna Momper
(74) *Attorney, Agent, or Firm* — Shoemaker and Mattare

(57) ABSTRACT

The invention relates to a brake disk comprising a ceramic friction ring (4) and a connecting flange (6) that is disposed concentric to the friction ring (4). The friction ring (4) is provided with a fastening ring (8) in an interior area, which encompasses fastening bores (10). The friction ring (4) is joined to the connecting flange (6) at the fastening bores (10) by means of fixing means. The invention is characterized in that the friction ring (4) is provided with relief slots (12) between the fastening bores (10) in the fastening ring (8), said relief slots (12) radially extending from an interior area of the fastening ring (8) in the direction of a friction zone (20) of the friction ring (4).

10 Claims, 2 Drawing Sheets

BRAKE DISK COMPRISING A CERAMIC FRICTION RING

CROSS REFERENCE TO RELATED APPLICATION

This application is a national stage of PCT/EP2004/004653 filed May 3, 2004 and based upon DE 103 21 797.5 filed May 14, 2003 under the International Convention.

BACKGROUND OF THE INVENTION

1. Field of the Invention

The invention relates to a brake disk.

2. Related Art of the Invention

In DE 297 10 533 U1 a brake disk is disclosed, featuring a ceramic friction ring which is connected by means of a connecting flange. Here the friction ring consists of a so-called ceramic matrix composite. The friction ring features a fastening ring with fastening bores in its center region and it is bolted together with a connecting flange through the fastening bores using bolts. During operation of the brake disk the friction ring heats up in a friction zone. In contrast, the fastening ring in the center region of the friction ring which is connected to the connecting flange remains relatively cool. Thus temperature gradients develop between the fastening ring and the friction zone which, under extreme conditions, can be as high as several hundred degrees Celsius. These temperature gradients cause thermal stresses which superpose upon existing mechanical stresses. Stress simulations revealed that, particularly in the region of the fastening ring, and there, in the region of the bores, stress concentrations may occur.

SUMMARY OF THE INVENTION

The objective of the invention is to minimize the thermal and mechanical stress developing in the friction ring during operation, compared to the state of the art.

The brake disk according to the invention comprises a ceramic friction ring and a connecting flange. The connecting flange is arranged concentrically to the friction ring. The friction ring features in a center region a fastening ring with fastening bores. By means of suitable fixing means, e.g. a screw connection, the fastening ring is connected to the connecting flange. The invention features relief slots in the fastening ring which run radially from the center part of the fastening ring to a friction zone of the friction ring.

The relief slots bring about a reduction in the thermal stress which develops from the aforementioned temperature gradients in the region of the fastening ring of the friction ring. Thus, in the region of the fastening ring, fundamentally only torsional forces caused by the retarding effort develop. The ceramic material of the friction ring is designed for such mechanical stress. The thermal stress caused by the different thermal expansion of the different friction ring regions is reduced by measures according to the invention, thereby significantly reducing the stress concentrations in the region of the bores of the fastening ring.

In order to avoid notch effects which may be caused by the relief slots in the friction ring it can be useful for certain designs of the friction ring to add relief bores to the relief slots at their outer end (with regard to their radial alignment).

The length of the relief slots is generally between 2 mm and 30 mm. The length depends on the design of the friction ring and on the width of the fastening ring. Preferably the relief slots run from the inner end of the fastening ring to the friction zone. Hence the relief slots are normally as long as the fastening ring is wide and have a length of preferably between 10 mm and 20 mm.

Preferably the number of relief slots is between 3 and 20 and they are normally arranged equidistantly. Their number also depends on the design of the friction ring and of the fastening ring as well as the diameter of the friction ring. A large number of relief slots results in a better reduction of thermal stress. A large number of interruptions however weakens the material around the fastening bores. This in turn results in a reduction of the mechanical strength in the region of the fastening bores. It has been found that a number between 10 and 14 relief slots is especially preferable.

In order to reduce noise during brake application it can also be advantageous, for certain designs of the friction ring, to choose six as the number of relief slots.

A preferred material for the ceramic friction ring is a carbon fiber reinforced silicon carbide ceramic. Such a ceramic material offers a high strength and a high damage tolerance through its fiber reinforcement.

BRIEF DESCRIPTION OF THE DRAWINGS

Advantageous embodiments of the invention will be described in detail in the examples below. They show.

DETAILED DESCRIPTION OF THE INVENTION

Figure 1:
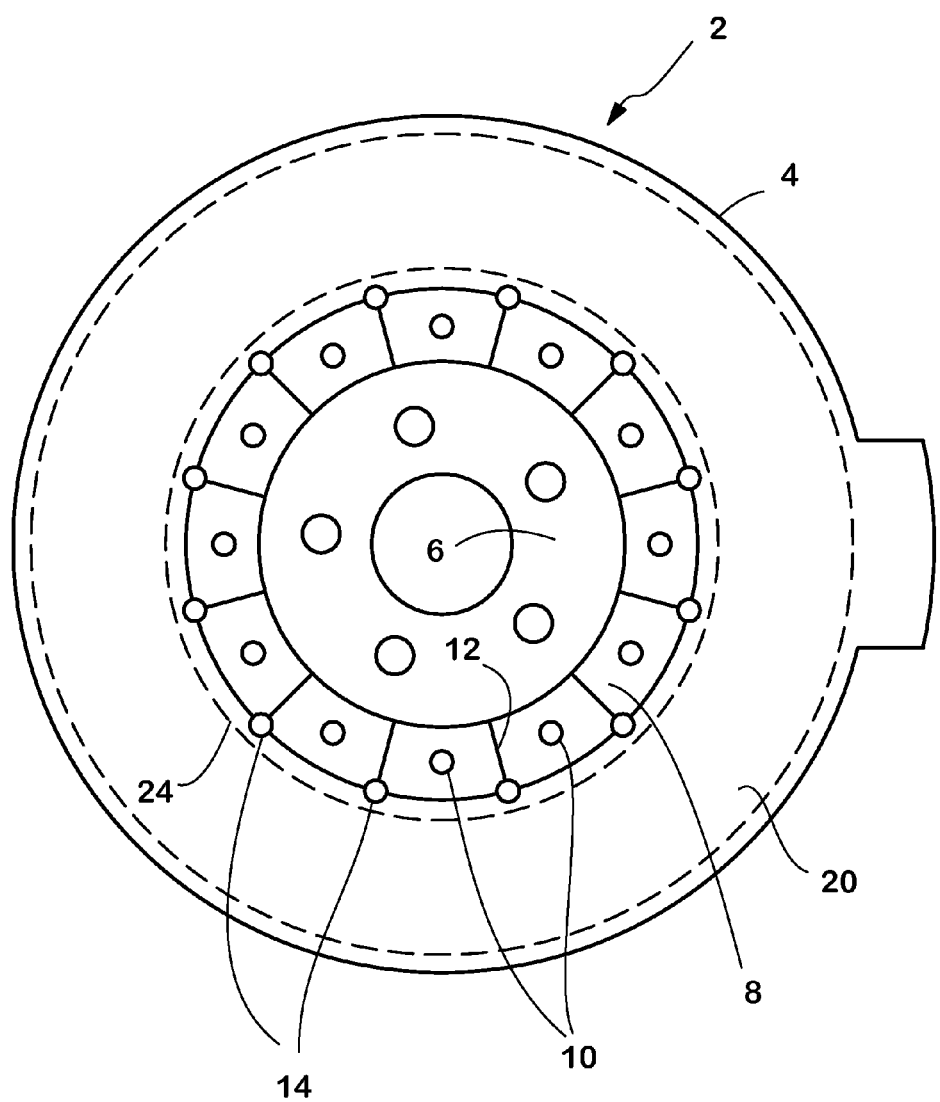
FIG. 1 a top view of a brake disk according to the invention with a friction ring and a connecting flange, FIG. 2 a perspective view of a friction ring according to the invention with a partial cross-sectional view.

In FIG. 1 a brake disk 2 is shown which features a ceramic friction ring 4 and a connecting flange 6. In a center region the friction ring 4 features a fastening ring 8. The fastening ring 8 features fastening bores 10 and relief slots 12. The relief slots 12 run from a center region of the friction ring 4 radially through the fastening ring 8 to a friction zone 20 of the friction ring 4. The friction zone 20 is depicted by the dashed lines in the friction ring. During brake application brake pads which are not shown here are located in this region. The friction zone 20 is the region of the friction ring which is exposed to the highest thermal loads. The relief slots 12 are designed such that they come as close as possible to the friction zone 20 (inner dashed line 24). As the case may be, the relief slots 12 can also extend into the friction zone 20. In this case calculations of the mechanical stability need to be taken into account, wherefore the relief slots 12 usually end about 1 mm to 5 mm before the beginning of the friction zone 20.

As shown in FIG. 1 the relief slots 12 end in relief bores 14. The relief bores 14 provide for a reduction of the possibly developing mechanical stress concentrations at the ends of the relief slots and prevent notch effects. Usually the relief bores 14 have a diameter between 1 mm and 7 mm.

FIG. 1 also shows a connecting flange 6 which is by means of a screw connection connected to the friction ring 4 in the region of the fastening ring 8. The screw connection is not shown in FIG. 1. Usually the connecting flange 6 consists of an aluminum alloy or steel. The use of these metals depends on the temperatures which develop during operation of the brake disk 2.

In FIG. 1 the connecting flange 6 is shown as additional component, which can be bolted to the hub of a wheel of a vehicle. However, the connecting flange 6 can just as well be constituted by the wheel hub of the vehicle itself. In this embodiment the friction ring 4 is connected directly to the wheel hub of the vehicle.

Through the use of a connecting flange 6 on the basis of aluminum, the weight advantage of the brake disk 2, which is already given by the low specific weight of the friction ring 4, can be significantly improved. In the embodiment of FIG. 1 the friction ring 4 features twelve equidistant relief slots 12. The dashed line 24 marks the inner border of the friction zone 20, which is just about contacted by a brake pad which is not shown here. Basically it is possible to run the relief slots 12 radially outwards up to the line 24.

Figure 2:
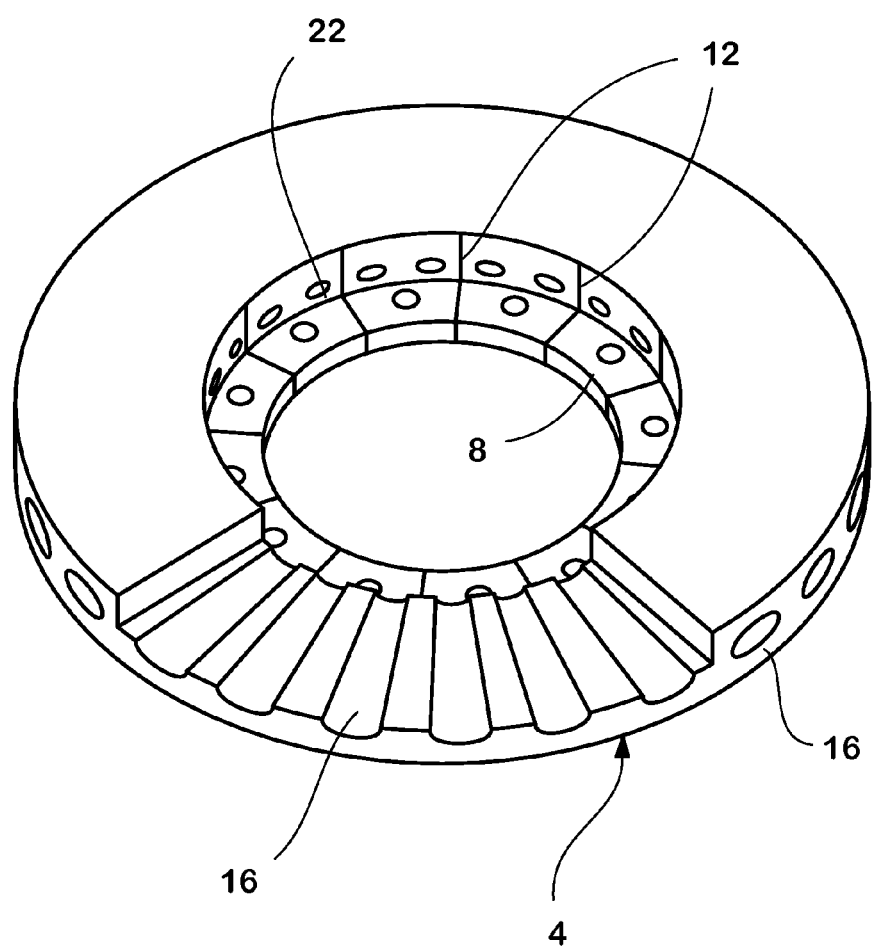

In FIG. 2 a perspective view of the friction ring 4 according to the invention is shown. The friction ring 4 in FIG. 2 features cooling holes 16 which in the front part of the drawing are shown in a partial cross-sectional view. Also in FIG. 2 it can be seen that the fastening ring 8 and the friction ring 4 feature different thicknesses. This results in a step 22 between the fastening ring 8 and the friction ring 4. The relief slots 12 preferably run so far to the outside that they pass across the step 22 and reach into the friction zone 20.

The fastening ring 8 which is an integral part of the overall friction ring 4, thus consisting of the same material as the friction ring 4, usually features a thickness between 5 mm and 40 mm. In a preferred embodiment the thickness of the fastening ring 8 is 12 mm. A radial dimension of the fastening ring 8 is between 10 mm and 40 mm, usually the radial dimension of the fastening ring 8 is 25 mm. Depending on the design of the cooling holes 16 the thickness of the friction ring 4 in the friction zone 20 is between 20 mm and 40 mm. The diameter of the brake disk 2 is between 250 mm and 400 mm.

For the fabrication of the ceramic friction ring 4 according to the invention usually a mixture of resin and carbon fibers is poured into a pressing mold, pressed and subsequently hardened at elevated temperatures. The result of the hardening is a carbon fiber reinforced plastic (CFRP). Subsequently the CFRP body is carbonized under exclusion of air to a carbon fiber reinforced carbon. In the following the carbon fiber reinforced carbon (CC) is referred to as a preform. The machining of the friction ring is usually done on the preform. In this state generally the relief slots 12 and as the case may be the relief bores 14 are machined. However it is also possible to create the relief slots 12/relief bores 14 during the pressing of the CFRP body by means of an accordingly shaped press form.

The machined preform is subsequently infiltrated or impregnated with silicon under exclusion of air at temperatures about 1600° C. During this infiltration the liquid silicon reacts with the carbon of the preform to silicon carbide. After cooling down the result is a silicon carbide ceramic which is reinforced with carbon fibers and as the case may be contains residual silicon.

The embodiment of the brake disk 2 according to the invention, especially of the friction ring 4, is can be extended to other ceramic materials as friction material. Alternative materials which are suitable for brakes are, for instance, metal matrix composites (MMC) or intermetallic composites. Fundamentally the construction according to the invention is applicable for all materials which are tribologically exceptionally durable but relatively brittle compared to gray cast iron.

We claim:

1. A brake disk rotor comprising a ceramic friction ring adapted for connecting centrally to a connecting flange, the friction ring having a ring shape and being a unitary structure, the friction ring comprising a radially outer region having a friction zone for engagement by braking pads and a radially inner region having a thickness less than that of said outer region so that there is a step where said outer and inner regions meet, said inner region having a radially internal edge and forming a fastening ring providing a fastening surface with fastening bores for receiving fasteners to couple said fastening surface to a corresponding surface of the connecting flange, wherein the friction ring, in the inner region, has relief slots which run between adjacent ones of the fastening bores radially from the internal edge of the radially inner region of the fastening ring and across said step into said outer region, terminating before the friction zone, said relief slots separating completely each inner region section with a fastening bore from an adjacent inner region section with a fastening bore, each relief slot ending at a relief bore having a diameter greater than the width of the slot.

2. The brake disk rotor according to claim 1, wherein the relief slots are between 2 mm and 30 mm in length.

3. The brake disk rotor according to claim 2, wherein the relief slots are between 10 mm and 20 mm in length.

4. The brake disk rotor according to claim 1, wherein the number of relief slots is between 3 and 20.

5. The brake disk rotor according to claim 4, wherein the number of relief slots is between 10 and 14.

6. The brake disk rotor according to claim 4, wherein the number of relief slots is 6.

7. The brake disk rotor according to claim 1, wherein the friction ring consists of a carbon fiber reinforced silicon carbide ceramic.

8. The brake disk rotor according to claim 1, wherein the relief slots end from about 1 mm to about 5 mm before the beginning of the friction zone.

9. The brake disk rotor according to claim 1, wherein the friction ring includes cooling holes extending radially internally within the friction ring.

10. The brake disk rotor according to claim 1, wherein each relief slot has opposite faces facing each other, said faces remaining substantially parallel along the radial extension of the relief slot.

* * * * *